US010438236B2

United States Patent
Matsumoto et al.

(10) Patent No.: US 10,438,236 B2
(45) Date of Patent: Oct. 8, 2019

(54) ADVERTISEMENT DISTRIBUTION PROGRAM, ADVERTISEMENT DISTRIBUTION METHOD FOR EXECUTING ADVERTISEMENT DISTRIBUTION PROGRAM AND ADVERTISEMENT CONTROL DEVICE

(71) Applicant: Yoshinori Matsumoto, Osaka-shi, Osaka (JP)

(72) Inventors: Yoshinori Matsumoto, Osaka (JP); Shingo Yabu, Toyonaka (JP)

(73) Assignee: Yoshinori Matsumoto, Osaka-Shi, Osaka (JP)

( * ) Notice: Subject to any disclaimer, the term of this patent is extended or adjusted under 35 U.S.C. 154(b) by 1008 days.

(21) Appl. No.: 14/066,155

(22) Filed: Oct. 29, 2013

(65) Prior Publication Data

US 2015/0120441 A1    Apr. 30, 2015

(51) Int. Cl.
*G06Q 30/00*      (2012.01)
*G06Q 30/02*      (2012.01)
(Continued)

(52) U.S. Cl.
CPC ......... *G06Q 30/0255* (2013.01); *G06Q 30/02* (2013.01); *G06Q 30/0269* (2013.01);
(Continued)

(58) Field of Classification Search
CPC .......... G06Q 30/0277; G06Q 30/0269; G06Q 30/02; G06Q 30/0255
See application file for complete search history.

(56) References Cited

U.S. PATENT DOCUMENTS

| 2001/0049628 A1* | 12/2001 | Icho | G06O 30/02 |
| | | | 705/14.25 |
| 2001/0056395 A1* | 12/2001 | Khan | G06Q 20/00 |
| | | | 705/37 |

(Continued)

OTHER PUBLICATIONS

Takahashi_An Effectivness Analysis of Value-based Mechanism in the Internet Advertisement Auction; 2011 First ACIS/JNU; 2011; p. 411-416.*

(Continued)

*Primary Examiner* — Radu Andrei
(74) *Attorney, Agent, or Firm* — Simpson & Simpson, PLLC; S. Peter Konzel

(57) ABSTRACT

An advertisement distribution program is configured to cause a computer 4 of an information processing device 3 to function as a first transmission control means which, when the number of advertisement points is equal to or higher than a predetermined number, transmits the link data of the shopping site to a user terminal along with the advertisement data of the shopping site, while when the number of advertisement points is lower than the predetermined number, transmits only the advertisement data of the shopping site to the user terminal 5, and a second transmission control means which, when the number of advertisement points turns from being equal to or higher than a predetermined number to being lower than the predetermined number, selects a specific purchaser from all purchasers at the shopping site, and transmits benefit information to the user terminal 5 operated by the selected purchaser.

7 Claims, 13 Drawing Sheets

(51) Int. Cl.
*G06T 3/00* (2006.01)
*G06T 1/00* (2006.01)
*H04N 21/414* (2011.01)

(52) U.S. Cl.
CPC ....... *G06Q 30/0277* (2013.01); *G06T 1/0021* (2013.01); *G06T 3/0006* (2013.01); *H04N 21/41415* (2013.01)

(56) References Cited

U.S. PATENT DOCUMENTS

| | | | | |
|---|---|---|---|---|
| 2002/0038244 A1* | 3/2002 | Amano | G06Q 30/02 | 705/14.56 |
| 2002/0059103 A1* | 5/2002 | Anderson | G06Q 30/02 | 705/14.27 |
| 2003/0097298 A1* | 5/2003 | Klimpl | G06Q 20/10 | 705/14.23 |
| 2003/0171981 A1* | 9/2003 | Bargnes | G06Q 10/06 | 705/7.16 |
| 2003/0225619 A1* | 12/2003 | Dokken | G06Q 30/02 | 705/14.29 |
| 2004/0193489 A1* | 9/2004 | Boyd | G06Q 30/02 | 713/176 |
| 2004/0230481 A1* | 11/2004 | Bushold | G06Q 20/20 | 715/764 |
| 2006/0010033 A1* | 1/2006 | Thomas | G06Q 30/02 | 705/14.29 |
| 2008/0301043 A1* | 12/2008 | Unbehagen | G06Q 20/10 | 705/39 |
| 2010/0131344 A1* | 5/2010 | Amorim | G06Q 30/00 | 705/14.23 |
| 2010/0280896 A1* | 11/2010 | Postrel | G06Q 30/02 | 705/14.29 |
| 2010/0287103 A1* | 11/2010 | Mason | G06Q 30/02 | 705/80 |
| 2011/0010238 A1* | 1/2011 | Postrel | G06Q 30/02 | 705/14.38 |
| 2011/0251882 A1* | 10/2011 | Richard | G06Q 30/02 | 705/14.25 |
| 2012/0041808 A1* | 2/2012 | Hofer | G06Q 20/32 | 705/14.17 |
| 2012/0041810 A1* | 2/2012 | Hofer | G06Q 20/12 | 705/14.23 |
| 2012/0302309 A1* | 11/2012 | Denton | A63F 3/081 | 463/17 |
| 2013/0159078 A1* | 6/2013 | Peck | G06Q 30/02 | 705/14.17 |
| 2014/0279534 A1* | 9/2014 | Miles | G06Q 20/42 | 705/44 |

OTHER PUBLICATIONS

Tarunni_Space Tag: An Overlaid Virtual System and its Applications; 1999 IEEE; 1999 p. 207-211.*

* cited by examiner

FIG. 2

SPONSOR DATABASE TABLE

| ADVERTISER IDENTIFICATION INFORMATION | COMPANY A | COMPANY B | COMPANY C | COMPANY D | ... |
|---|---|---|---|---|---|
| ADVERTISEMENT RATE | 150000 | 230000 | 4000 | 20000 | |
| NUMBER OF ADVERTISEMENT POINT | 15000 | 2000 | 368 | 50 | |
| PRIZE | SHIBA FEMALE | LARGE-SIZED CAGE | BOOK OF 100 TICKETS FOR PET GROOMING STUDIO | BOOK OF 200 TICKETS FOR PET GROOMING STUDIO | |
| TOTAL PURCHASE POINTS | 0 | 21000 | 32 | 150 | |
| PUBLICITY IMAGE | IMAGE A1 | IMAGE B1 | IMAGE C1 | IMAGE D1 | |
| SHOPPING SITE URL | SITE D1 | SITE D1 | SITE D1 | SITE D1 | |
| PRODUCT BY TYPE | PRODUCT A1 | PRODUCT B1 | PRODUCT C11 | PRODUCT C21 | |
| | PRODUCT A2 | PRODUCT B2 | PRODUCT C12 | PRODUCT C22 | |
| | PRODUCT A3 | PRODUCT B3 | PRODUCT C13 | PRODUCT C23 | |
| | PRODUCT A4 | PRODUCT B4 | PRODUCT C14 | PRODUCT C24 | |
| | ... | ... | ... | ... | |
| | PRODUCT An | PRODUCT Bn | PRODUCT Cn | PRODUCT C2n | |

Fig. 3

USER DATABASE TABLE

| ONE'S NAME | IDENTIFICATION INFORMATION | PURCHASE PRICE | PERSONAL PURCHASE POINT | SITE INFORMATION | PRODUCT INFORMATION |
|---|---|---|---|---|---|
| PERSON X | x1 | 2500 | 25 | SITE A1 | PRODUCT A4 |
| PERSON Y | y1 | 1000 | 10 | SITE C1 | PRODUCT C3 |
| PERSON Z | z1 | 1500 | 15 | SITE C2 | PRODUCT C3 |
| PERSON X | x1 | 3000 | 30 | SITE A1 | PRODUCT A1 |
| ... | | | | | |
| ... | | | | | |
| ... | | | | | |
| ... | | | | | |
| ... | | | | | |

ADVERTISEMENT DISTRIBUTION PROGRAM, ADVERTISEMENT DISTRIBUTION METHOD FOR EXECUTING ADVERTISEMENT DISTRIBUTION PROGRAM AND ADVERTISEMENT CONTROL DEVICE

BACKGROUND OF THE INVENTION

1. Field of the Invention

The present invention relates to a device for controlling consumption of advertising rates which provides the advertising information executed on web pages on a network such as the Internet. More specifically, the present invention relates to, in displaying advertisement information on a web page, a deposit type device for controlling consumption of an advertisement rate which receives an advertisement rate in the form of an advance, and causes to consume the advertisement rate received in advance from the received advertisement rate depending on the cumulative time of viewing or a number of views of the advertisement.

2. Description of Related Art

The advertisement industry has been developing advertising business on media such as newspaper and newspaper inserts from long ago, and has been stimulating the desire to purchase in the market through this advertising business, and contributing to the development of the industry through the activation of the market. In addition, the media of such advertising business has been diversified from conventional newspaper to radio and television. Recently, the advertising business has been conducted on further diversified media such as personal computers, cellular phones and smartphones with the advancement of wide area networks such as the Internet, and its weights have been changing.

Meanwhile, when a web page is viewed on a personal computer or a smartphone, first, there are web sites which play the role of entrances called portal sites. On this web site, banner advertisements associated with company names, product names and their web links are provided, and areas for suitably indicating movies broadcasted as commercial films on television and other media are sometimes set.

This movie indication area is so set not to display publicity movies selected by the user, but to display publicity movie information of products or enterprises determined in advance, which are switched suitably.

For the companies operating such portal sites, collecting charges for hosting publicity and advertisement from companies and the like by providing banner advertisements and movie information in movie indication areas (hereinafter referred to as net advertising) makes up a great part of their sources of earnings.

Contract forms of advertisement rates of the net advertising generally include, for example, CPM (Cost per Mill), where an amount of money is charged as an advertisement rate unit price for a predetermined number of distribution of banner advertisements, CPC (Cost per Click), where an amount of money is charged per click of the banner advertisement as an advertisement rate unit price, CPA (Cost per Action), where a certain amount of money is paid as a unit price of advertisement rate for each action as an outcome specified by the advertiser, for example, a purchase of a product, among others. Such charging systems are disclosed in Japanese Unexamined Patent Publications No. 2006-120135 and No. 2005-190005.

Moreover, the technique for differentiating services provided depending to the viewing time of users who are desired views is known to be disclosed in Japanese Unexamined Patent Publication No. 2001-344503.

Moreover, in order to have an advertisement publicity movie displayed on the homepage of the portal site, the deposit method can be employed, but it has been difficult for companies and shops with low funding abilities to adopt the method because the advertisement rate is very high since a large area of the homepage is reserved for movie display.

Furthermore, a banner advertisement can be easily employed even by companies and privately managed shops with limited funding ability since it is post-pay, but when a plurality of banner advertisements are attached on the web page, the aesthetic appearance of this web page itself is deteriorated. Therefore, from the perspective that a web page with a number of banner advertisements may discourage users from coming back to the site, there has been the impression that it is not unfavorable for its too strong locality. That is, it is highly likely that the problem of the loss of aesthetic appearance of the homepage occurs.

Furthermore, in the case of banner advertisement, the actual advertisement rate is sometimes higher than an expected advertisement rate since the advertisement rate to be paid is unclear, which has been a cause of trouble between the payer and receiver of the advertisement rate.

Stated above are the problems seen from the perspective of the side which provides advertisement. Moreover, seen from the user's side, there have been the following problems.

That is, it is rare that users actively wish to view the information relating to advertisement. For example, there are few users, if any, who like TV commercial films themselves. This is supported by the fact that the feature in video recorders which allow skipping viewing commercial films during recording and reproducing videos has been popular. Therefore, in the case of TV commercial films, music used is carefully selected and famous talents are employed to attract users to commercial films. Too much emphasis put on attracting users to commercial films has been causing the problem that the description of the particulars of the product to be advertised is sometimes forgotten.

Furthermore, showing a commercial film of a product which is not interesting for users can be considered the achievement of the intended purpose for the advertisement provider side, while on the other hand it can be unpleasant for users.

SUMMARY OF THE INVENTION

An object of the present invention is to provide an advertisement distribution program and an advertisement control device which are capable of providing advertisement information in a beneficial form both for both an advertiser and a user.

The present invention is an advertisement distribution program which causes a computer of an information processing device comprising a communication interface which is capable of data communication with a plurality of user terminals and a storage device as:

a number-of-advertisement-points storage means which stores a number of advertisement points in association with the shopping site in the storage device depending on an advertisement rate paid by an advertiser of a shopping site in advance, a shopping information storage means which stores in the storage device a purchase price of items purchased at the shopping site in association with the personal information of a purchaser, a number-of-points subtraction means which subtracts a number of purchase points from the number of advertisement points depending on the purchase price at the shopping site, a first transmission control means which, when the number of advertisement points is equal to or higher than a predetermined number, transmits link data of the shopping site to the user terminal along with advertisement data of the shopping site, while when the number of advertisement points is lower than a predetermined number, transmits only the advertisement data of the shopping site to the user terminal, and a second transmission control means which, when the number of advertisement points turns from being equal to or higher than a predetermined number to being lower than the predetermined number, selects a specific purchaser from all the purchasers at the shopping site, and transmits benefit information to the user terminal operated by the purchaser.

According to the above-mentioned constitution, when the number of advertisement points is equal to or higher than a predetermined number, by transmitting the link data of the shopping site along with the advertisement data of the shopping site to a user terminal, it is possible to make the user view the advertisement (still images and videos) with the link via the user terminal. Accordingly, a user who is interested in the advertisement can move to a shopping site by clicking on the link of the advertisement or by other means, and can easily have opportunities to purchase products and services. Moreover, the purchaser who is the user that has purchased the products and services obtains an opportunity to acquire benefit information when the number of advertisement points turns from being equal to or higher than the predetermined number to being lower than the predetermined number. As a result, the advertiser can provide advertisements with links, and it is beneficial for the user to purchase at the shopping site which is the link of the advertisement, and therefore advertisement information can be provided in a beneficial form for both the advertiser and user.

The second transmission control means in the present invention may select the purchaser as of the time when the number of advertisement points turn from being equal to or higher than the predetermined number to being lower than the predetermined as the specific purchaser.

According to the above-mentioned constitution, it is possible to motivate the user to actively purchase at the shopping site of the link of the advertisement.

The first transmission control means in the present invention may, when the number of advertisement points is lower than a predetermined number, further transmit the number of advertisement points information which directly or indirectly indicates the latest number of advertisement points subtracted by the subtraction means to the user terminal.

According to the above-mentioned constitution, by directly or indirectly checking the latest number of advertisement points, it is possible to maintain the user's desire to purchase by informing the user of approximate time when he/she can receive benefits.

The present invention is an advertisement distribution control device which has a communication interface which is capable of data communication with a plurality of user terminals, a number-of-advertisement-points storage unit which stores a number of advertisement points in association with the shopping site depending on an advertisement rate paid by an advertiser of a shopping site in advance, A shopping information storage unit which stores a purchase price purchased at the shopping site in association with the personal information of a purchaser, a number-of-points subtraction unit which subtracts the number of purchase points depending on the purchase price from the number of advertisement points at the shopping site, a first transmission control unit which, when the number of advertisement points is equal to or higher than a predetermined number, transmits link data of the shopping site to the user terminal along with advertisement data of the shopping site, while when the number of advertisement points is lower than a predetermined number, transmits only the advertisement data of the shopping site to the user terminal, and a second transmission control unit which, when the number of advertisement points turns from being equal to or higher than a predetermined number to being lower than the predetermined number, selects a specific purchaser from all the purchasers at the shopping site, and transmits benefit information to the user terminal operated by the purchaser.

According to the above-mentioned constitution, when the number of advertisement points is equal to or higher than a predetermined number, by transmitting the link data of the shopping site along with the advertisement data of the shopping site to a user terminal, it is possible to make the user view the advertisement (still images and videos) with the link via the user terminal. Accordingly, the user who is interested in the advertisement can move to a shopping site by clicking on the link of the advertisement or by other means, and can easily have opportunities to purchase products and services. Moreover, the purchaser who is the user that has purchased the products and services obtains an opportunity to acquire benefit information when the number of advertisement points turns from being equal to or higher than the predetermined number to being lower than the predetermined number. As a result, the advertiser can provide advertisements with links, and it is beneficial for the user to purchase at the shopping site which is the link of the advertisement, and therefore advertisement information can be provided in a beneficial form for both the advertiser and user.

The present invention can provide advertisement information in a beneficial form for both the advertiser and the user.

BRIEF DESCRIPTION OF THE DRAWINGS

FIG. 2 is an illustrative drawing of a data table of a sponsor database.
FIG. 3 is an illustrative drawing of a data table of a user database.

DETAILED DESCRIPTION OF THE INVENTION (Advertisement Distribution Program)

An embodiment of the present invention will be described with reference to drawings.

Figure 1:
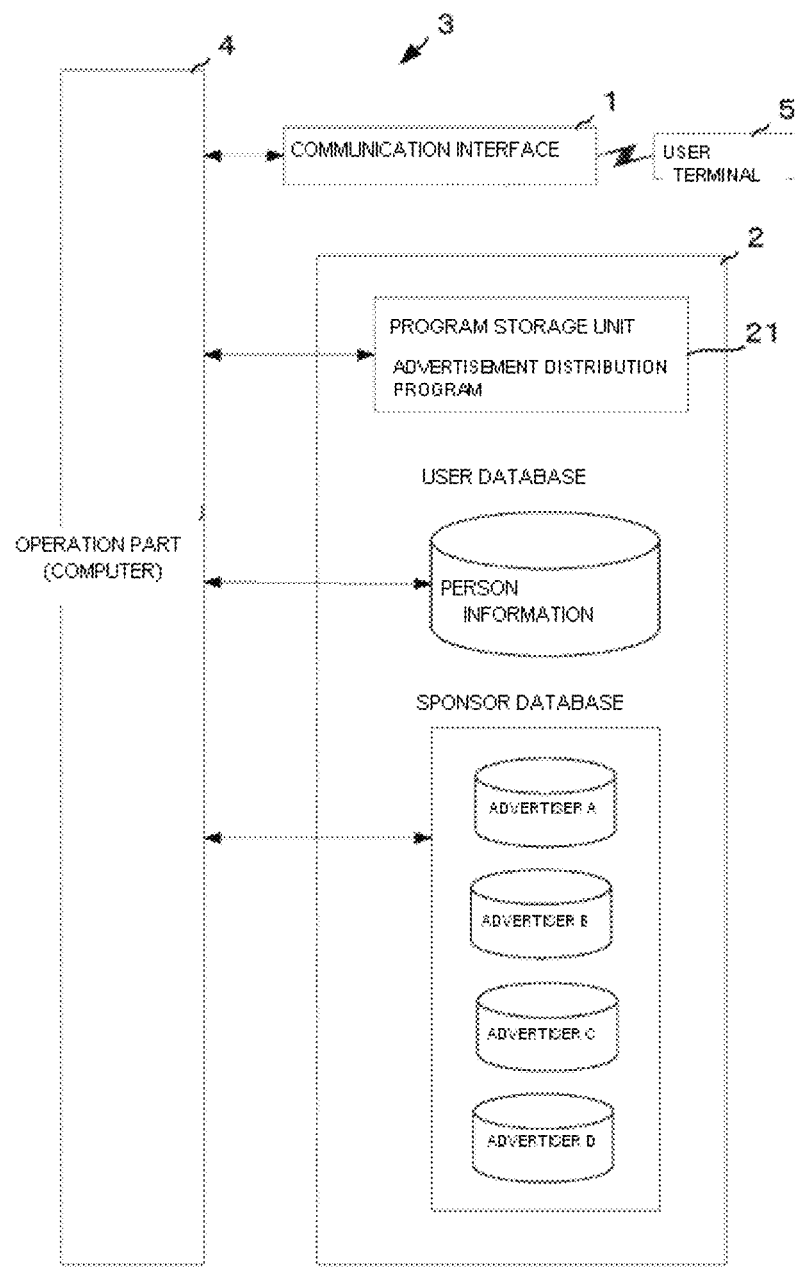
FIG. 1 is a block diagram of an information processing device.

As shown in FIG. 1, the advertisement distribution program according to this embodiment is configured to cause a computer 4 of an information processing device 3 including a storage device 2 and a communication interface 1 which is capable of data communication with a plurality of user terminals 5 to function as a means described below.

Specifically, the advertisement distribution program has each program routine to cause the computer 4 to function as a number-of-advertisement-points storage means which stores a number of advertisement points depending on an advertisement rate paid by an advertiser of a shopping site in advance in the storage device 2 in association with the shopping site, a shopping information storage means which stores a purchase price purchased at the shopping site in the storage device 2 in association with the personal information of the purchaser, a number-of-points subtraction means which subtracts a number of purchase points from the number of advertisement points depending on the purchase price at the shopping site, a first transmission control means which, when the number of advertisement points is equal to or higher than a predetermined number, transmits to a user terminal the link data of the shopping site along with the advertisement data of the shopping site, while when the number of advertisement points is lower than a predetermined number, transmits only the advertisement data of the shopping site to the user terminal 5, when the number of advertisement points turns from being equal to or higher than a predetermined number to being lower than the predetermined number, selects a specific purchaser from all purchasers at the shopping site, and the second transmission control means which transmits benefit information to the user terminal 5 operated by the selected purchaser.

Herein, "the number of advertisement points depending on the advertisement rate" means a numerical value which is obtained by multiplying the advertisement rate by a predetermined ratio such as 10 percent. "Personal information" means various kinds of information relating to the user such as an ID data and telephone number to identify the user, the access data of the user terminal 5, address, one's date of birth, name, abbreviated name, purchase price, personal purchase point, and products and shopping sites.

"The number of purchase points depending on the purchase price" is a numerical value which is obtained by multiplying the purchase price by a predetermined ratio such as 1 percent. The ratio for calculating the number of advertisement points and the ratio for calculating the number of purchase points may be the same or different. Furthermore, the ratios may be the same or different depending on the shopping sites, products, and services, or may be the same or different by the decision of the advertiser. Moreover, the ratio for calculating the number of purchase points may be changed depending on the number of accesses of the user to the shopping site, or may be randomly or deliberately changed for predetermined timing such as the timing of purchase, the timing of access, the date, the day of the week, etc.

The "predetermined number" may be a natural number or an integer. The predetermined number may be individually set by the agreement between the advertisement distributor and the advertiser. The "advertisement data" includes at least one still image and video, and is displayed as an advertisement screen in all or part of the display screen of the user terminal 5. It is preferable that the advertisement screen is made enlargeable and shrinkable by the operation of the user. Moreover, the advertisement data may include audio, and advertising by audio may be performed along with the advertisement screen, and audio may be output to allow the user to notice the advertisement.

In "selecting the specific purchaser", such a purchaser may be selected by a method of randomly selecting from all purchasers at the shopping site, or may be selected by another method. For example, the purchaser with the highest purchase price may be selected, or a method of randomly selecting a purchaser under the condition of being so set that the higher the purchase price, the higher the probability of being selected may be employed. The number of purchasers may be singular or plural. Furthermore, the purchaser as of when the number of advertisement points turns from being equal to or higher than the predetermined number to being lower than the predetermined number may be selected as the specific purchaser. That is, the method of selecting the "specific purchaser is preferably such that can motivate the user to actively purchase at the shopping site of the link of the advertisement.

The "user terminal 5 operated by the purchaser" may be the user terminal 5 such as a cellular phone and personally used personal computer registered in advance by the user, who is the purchaser, in this case. For example, when a purchase was made by operating the user terminal 5 such as a public or shared personal computer, the benefit information is communicated via the user terminal 5 such as a cellular phone of the user. Therefore, any winning can be easily communicated by the benefit information. Moreover, "the user terminal 5 operated by the purchaser" may be the user terminal 5 which is being operated by the user, who is the purchaser. In this case, any winning by the benefit information can be instantly communicated while shopping.

The "benefit information" may be any information which is beneficial for users in any way. For example, it may be the winning information of prizes and services, or it may be the amount increment information of the number of purchase points.

According to the advertisement distribution program so configured as mentioned above, when the number of advertisement points is equal to or higher than a predetermined number, by transmitting the link data of the shopping site to the user terminal 5 along with the advertisement data of the shopping site, it is possible to make the user view an advertisement (still images and videos) with a link via the user terminal 5. Accordingly, the user who is interested in the advertisement can move to a shopping site by clicking on the link of the advertisement or by other means, and can easily have opportunities to purchase products and services. Moreover, the purchaser who is the user that has purchased the products and services when the number of advertisement points turns from being equal to or higher than the predetermined number to being lower than the predetermined number, obtains an opportunity to acquire benefit information. As a result, the advertiser can provide advertisements with links, and it is beneficial for the user to purchase at the shopping site which is the link of the advertisement benefit, and therefore advertisement information can be provided in a beneficial form for both the advertiser and user.

Moreover, the advertisement distribution program is preferably configured to, in the first transmission control means, when the number of advertisement points is lower than the predetermined number, further transmit to the user terminal 5 the number of advertisement points information which directly or indirectly indicates the latest number of advertisement points subtracted by the subtraction means. Herein, "directly or indirectly indicates the number of advertisement points" means to visibly indicate the number of advertisement points directly to the user by a numerical value, and to indirectly indicate the number of advertisement points with an image such as a bar graph. In this case, by directly or indirectly checking the latest number of advertisement points, it is possible to keep motivating the user to purchase because the user is notified of an approximate time that he/she can expect to receive the benefit.

The above-mentioned advertisement distribution program is configured to be transmitted via a communication system which is capable of interactive data communication such as the internet or a transmission system which is capable of one-way data transmission such as television broadcasting and radio broadcasting, so that it is installed in the target information processing device 3. It should be noted that the advertisement distribution program may be recorded in a recording medium such as a compact disk and a memory stick, and installed in the information processing device 3 using such a recording medium.

(Advertisement Control Device 3)

The information processing device 3 having the advertisement distribution program installed therein has a communication interface 1 which is capable of data communication with a plurality of user terminals 5, a number-of-advertisement-points storage unit which stores a number of advertisement points depending on an advertisement rate paid by an advertiser of a shopping site in advance in association with the shopping site, a shopping information storage unit which stores a purchase price purchased at the shopping site in association with the personal information of the purchaser, a number-of-points subtraction unit which subtracts a number of purchase points from the number of advertisement points depending on the purchase price at the shopping site, a first transmission control unit which, when the number of advertisement points is equal to or higher than a predetermined number, transmits the link data of the shopping site to the user terminal 5 along with the advertisement data of the shopping site, while when the number of advertisement points is lower than a predetermined number, transmits only the advertisement data of the shopping site to the user terminal 5, and a second transmission control unit which, when the number of advertisement points turns from being equal to or higher than a predetermined number to being lower than the predetermined number, selects a specific purchaser from all purchasers at the shopping site, and transmits benefit information to the user terminal 5 operated by the purchaser. It should be noted that the information processing device 3 may be constituted by an electronic circuit having components constructed by logic circuits.

More specifically, the information processing device 3 has a communication interface 1, the user terminal 5 or the identification information for each user, a user data storage unit storing personal information containing the user terminal information 5 designated by each user, an advertisement data storage unit storing advertisement data for each of a plurality of advertisers, a link data storage unit storing the link data of the shopping site associated with the advertisement data, a shopping information storage unit which stores a purchase price purchased at the shopping site in association with the personal information of the purchaser, a number-of-advertisement-points converting unit which converts a number of advertisement points the advertisement rate paid in advance by the advertiser, a number-of-advertisement-points storage unit which stores the number of advertisement points of each of the advertisers in association with the shopping site, a purchase point converting unit which converts the purchase price at the shopping site into the number of purchase points, a number-of-points subtraction unit which specifies the advertiser of the shopping site which has generated the number of purchase points, and subtracts the number of purchase points from the number of advertisement points of the advertiser, a first transmission control unit which, when the number of advertisement points is equal to or higher than a predetermined number, transmits the link data of the shopping site to the user terminal 5 along with the advertisement data of the shopping site, while when the number of advertisement points is lower than a predetermined number, transmits only the advertisement data of the shopping site to the user terminal 5, a second transmission control unit which, when the number of advertisement points turns from being equal to or higher than a predetermined number to being lower than the predetermined number, selects a specific purchaser from all purchasers at the shopping site, and transmits benefit information to the user terminal 5 of the user terminal information specified by the purchaser as the user.

In the advertisement distribution program, an advertiser management process routine, a user management process routine and a distribution control process routine are stored in a program storage unit 21 of the storage device 2. The details of each of the process routines will be described later.

The number-of-advertisement-points storage unit, the advertisement data storage unit, and the link data storage unit constitute part or all of a sponsor database in the storage device 2. In the sponsor database, for example, each storage unit is formed in the format of the data table of FIG. 2. The shopping information storage unit and the user data storage unit constitute part or the entire user database in the storage device 2. In the user database, for example, each of the storage units is formed by the formation of the data table of FIG. 3. It should be noted that each of the storage units in each of the databases may be respectively formed by an independent data table. Moreover, the sponsor database and user database are not necessarily stored in the storage device 2, and may be constituted in a server device connected via a data communication network. In this case, a sponsor database and user database having large capacities can be constructed.

(Advertisement Distribution System)

Figure 4:
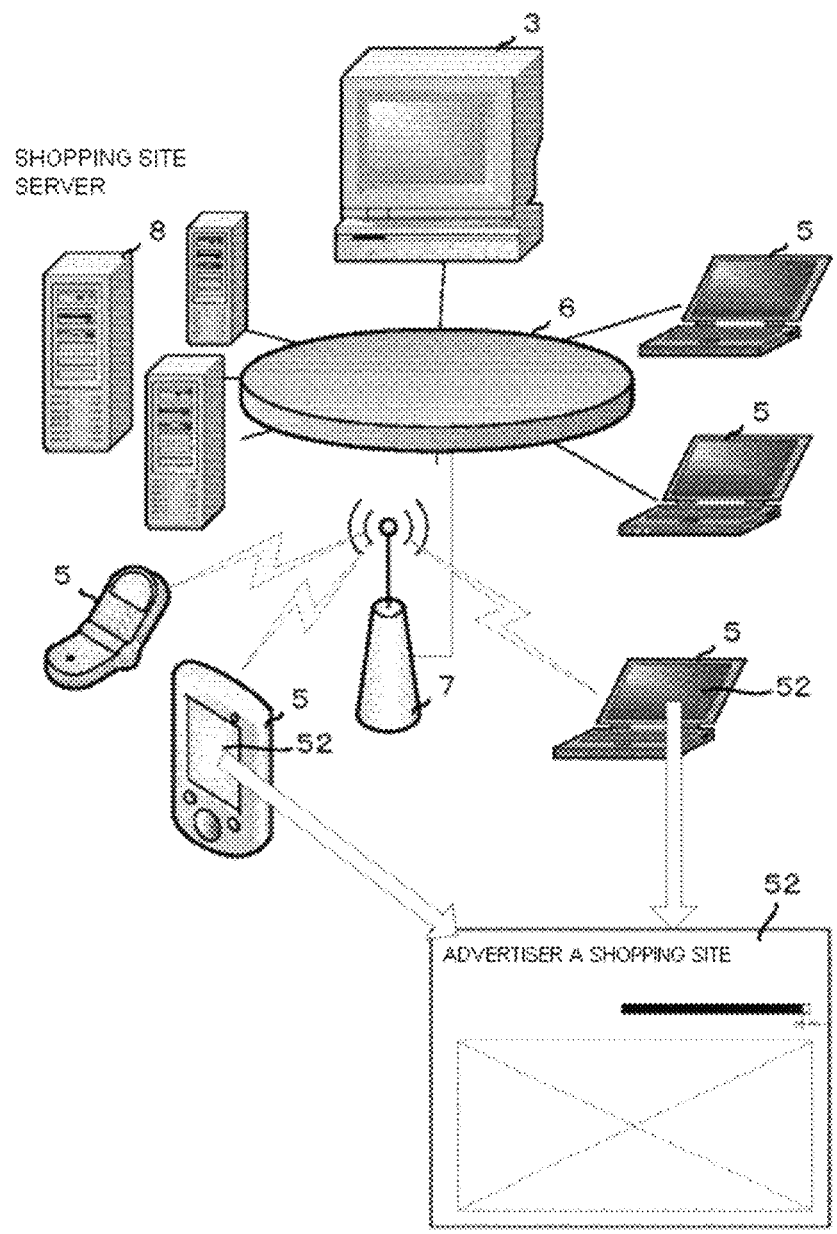
FIG. 4 is an outline illustrative drawing of an advertisement distribution system.

The above-mentioned information processing device 3, as shown in FIG. 4, is incorporated into the advertisement distribution system constructed via a data communication network 6 such as the internet. The advertisement distribution system has, in addition to the information processing device 3 and the data communication network 6, one or more of the user terminal 5 connected by cable or wirelessly to the data communication network 6, one or more radio towers 7, and one or more shopping site servers 8 storing various data of the shopping site. The radio tower 7 enables wireless data communication for the user terminal 5 remote from the data communication network 6.

(User Terminal 5)

Figure 5:
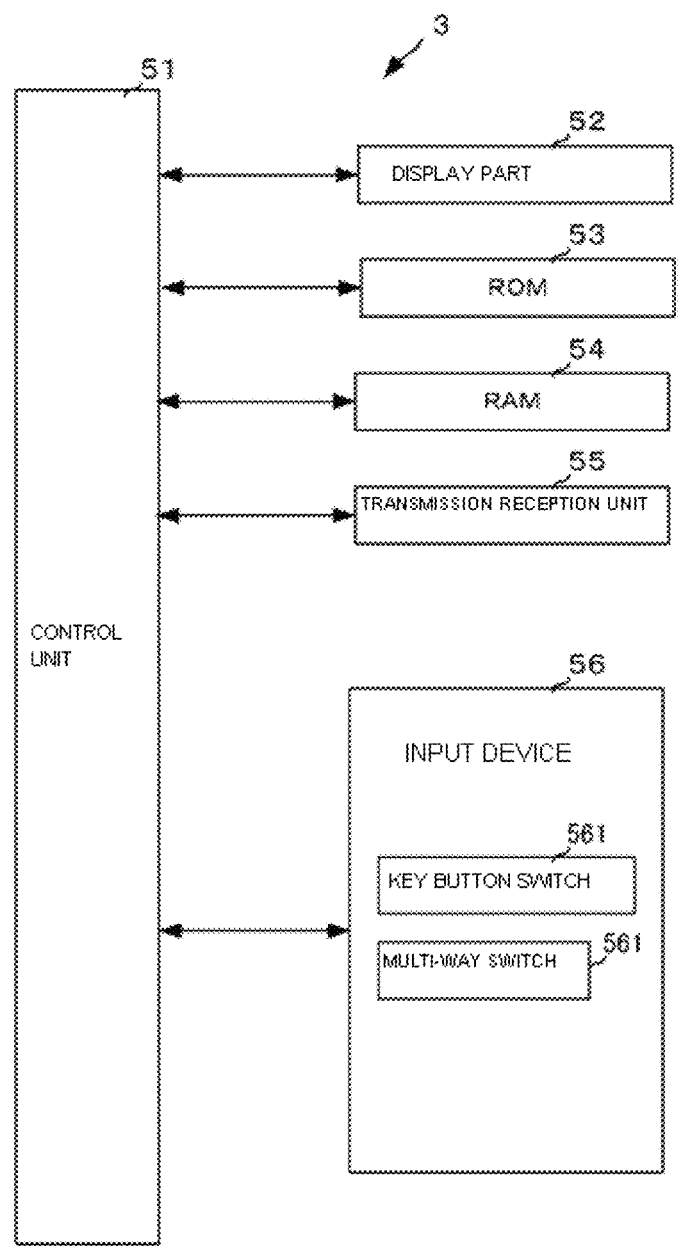
FIG. 5 is a block diagram of a user terminal.

The user terminal 5 is formed by an information terminal apparatus such as a personal computer and a cellular phone. Specifically, as shown in FIG. 5, the user terminal 5 has a control unit 51, a display part 52, a ROM 53, a RAM 54, a transmitter-receiver unit 55, and an input unit 56. The display part 52 is formed by a liquid crystal display device that displays various information and a display device such as a plasma display device. It should be noted that on the surface the display part 52, a touch panel is preferably provided in part of the input unit 56.

The display part 52 displays screens, for example, as shown in FIGS. 6 to 9. The details of the screens shown in FIGS. 6 to 9 will be described later. The ROM 53 and the RAM 54 store various data used in the user terminal 5. The transmitter-receiver unit 55 enables data communication for the radio tower 7 in FIG. 4 using radio wave. The input unit 56 includes various input devices such as a key button switch 561 and a multi-way switch 562, allowing data input and command input by the user from the outside.

(Display Screen of User Terminal 5: Shop Genre Screen)

Figure 6:
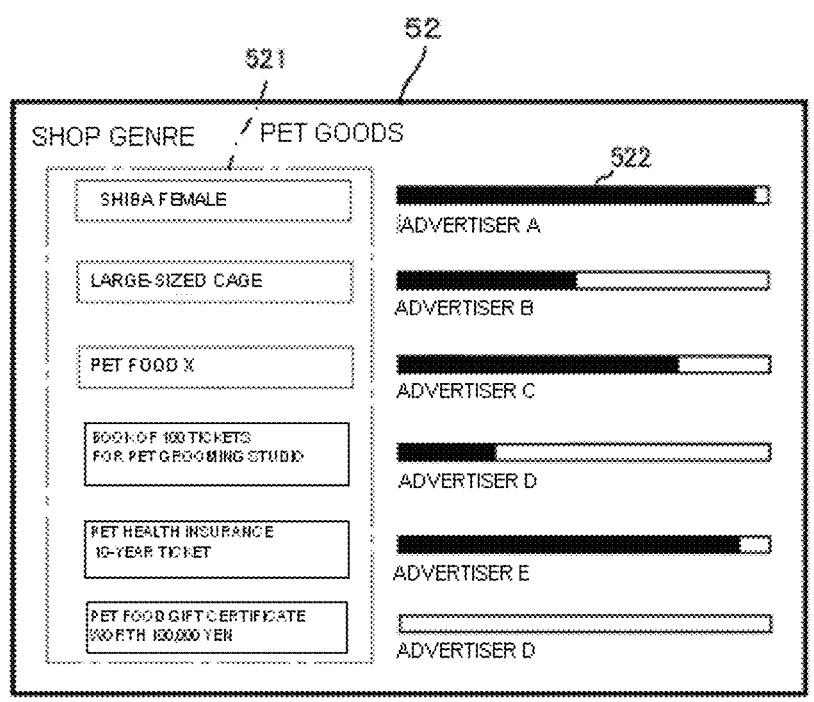
FIG. 6 is an illustrative drawing of a display screen.
Figure 7:
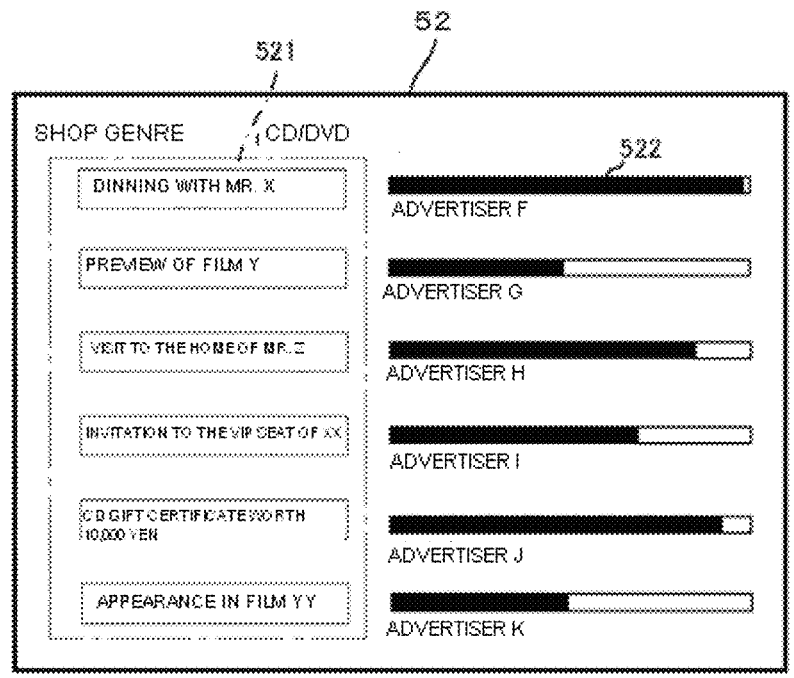
FIG. 7 is an illustrative drawing of a display screen.

The screens of FIGS. 6 and 7 have a prize information display unit 521 and a number-of-advertisement-points display unit 522. The prize information display unit 521 displays prize information such as a large-sized cage. The number-of-advertisement-points display unit 522 displays a bar graph indicating the remaining numbers of advertisement points associated with each of advertisers A to D. Accordingly, the genre screen displays the advertiser, prize information, and the remaining number of advertisement points by the unit of shop genre, whereby it is possible for the user to easily recognize which site of the advertiser to move (jump) to win the prize with higher probability when the genre of products and services is selected.

(Display Screen of User Terminal 5: Advertisement Screen)

Figure 8:
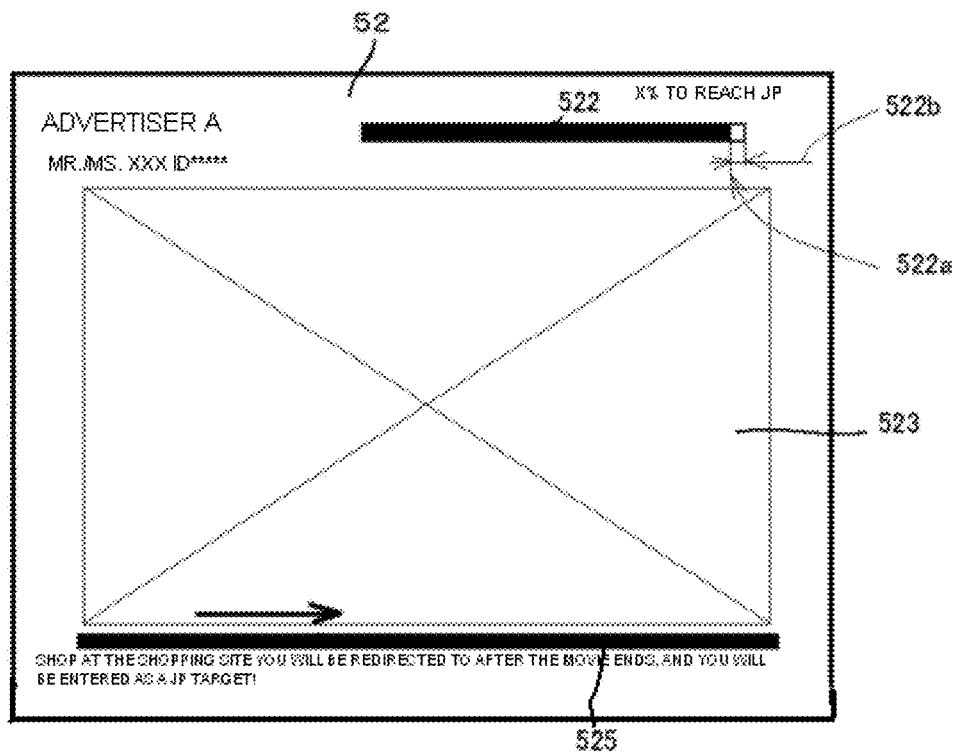
FIG. 8 is an illustrative drawing of a display screen.

Moreover, the screen of FIG. 8 is an advertisement screen, and has an advertisement display part 523 which displays an advertisement picture of advertiser A, the number-of-advertisement-points display unit 522, and an image time display unit 525. The number-of-advertisement-points display unit 522 and the image time display unit 525 are disposed above and below the number-of-advertisement-points display unit 522, respectively. The number-of-advertisement-points display unit 522 as mentioned above is a bar graph indicating the remaining number of advertisement points, and the entire bar graph indicates the total number of the advertisement points. A color-identified portion 522a in the bar graph indicates the number of advertisement points accumulated up until that time, while the rest of the entire bar graph and the color-identified portion 522a, i.e., a region 522b, indicates the remaining number of advertisement points for reaching JP, which triggers the benefit information. It should be noted that the remaining number of advertisement points is also indicated by a numerical value. Specifically, it is displayed "X % to reach JP".

The image time display unit 525 indicates the remaining time until the indication of the advertisement is finished in the advertisement the display part 523 with a bar graph. Below this the image time display unit 525, it is indicated that "Shop at the shopping site you will be redirected to after the movie ends, and you will be entered as a JP target!" This indication allows to show to the user that a condition that the user can win the benefit can be attained if the user waits until the advertisement is finished in the advertisement display part 523.

Figure 9:
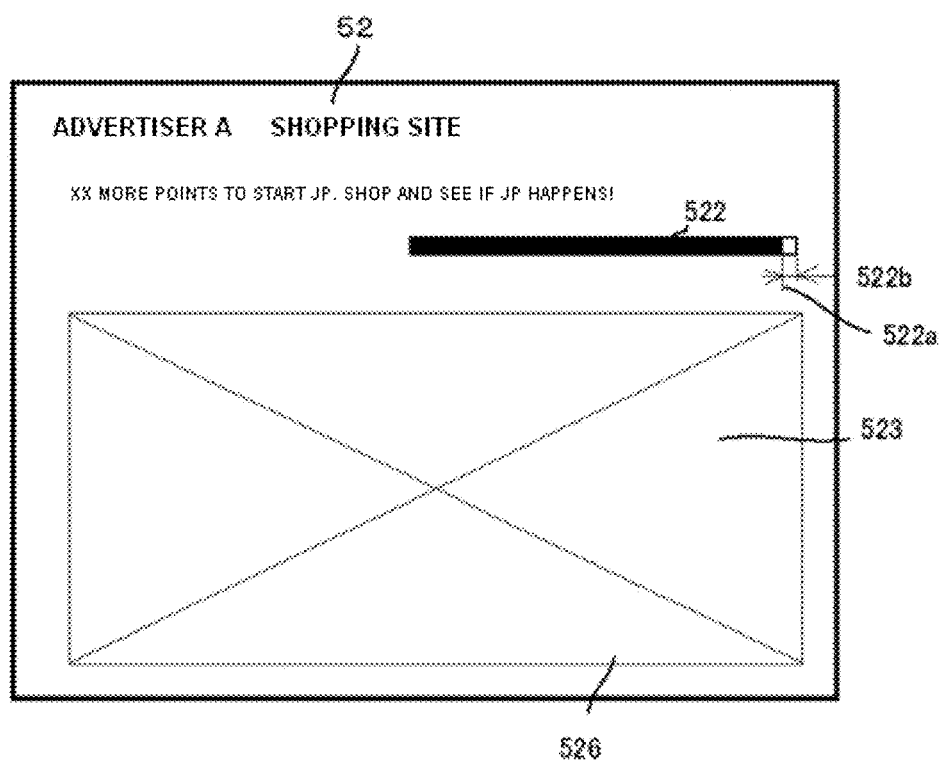
FIG. 9 is an illustrative drawing of a display screen.

The screen of FIG. 9 is a screen of the shopping site which is the link of the advertisement screen of FIG. 8. This screen has a shopping screen unit 526 and the number-of-advertisement-points display unit 522. The shopping screen unit 526 displays the images and pictures, and character information of products and services exhibited by advertiser A. It is indicated that "XX MORE POINTS TO START JP. SHOP AND SEE IF JP HAPPENS!" near the number-of-advertisement-points display unit 522. This is intended to arouse the user's desire to purchase.

(Operation of Information Processing Device 3)

In the above-mentioned constitution, as shown in FIG. 4, the advertisement distribution program is transmitted from software houses and stores to the information processing device 3, and is downloaded into the storage device 2 of the information processing device 3. In addition, the advertisement distribution program is installed in the information processing device 3, whereby the advertisement distribution system is constructed.

Figure 10:
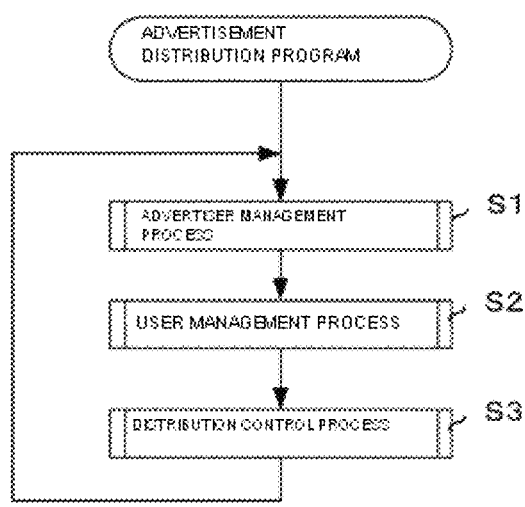
FIG. 10 is a flowchart of an advertisement distribution program.

Subsequently, as shown in FIG. 10, the advertisement arrangement program of the information processing device 3 is executed. Accordingly, an advertiser management process (S1), a user management process (S2), and a distribution control process (S3) are executed sequentially in cooperation by predetermined time units, so that they are executed apparently in parallel.

(Advertisement Management Routine)

Figure 11:
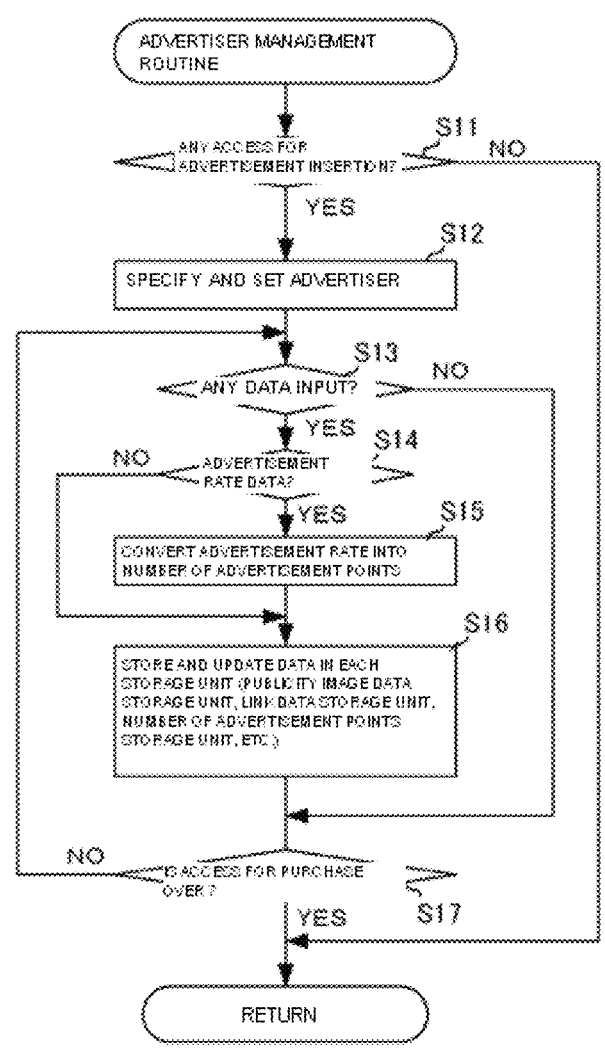
FIG. 11 is a flowchart of an advertiser management routine.
Figure 12:
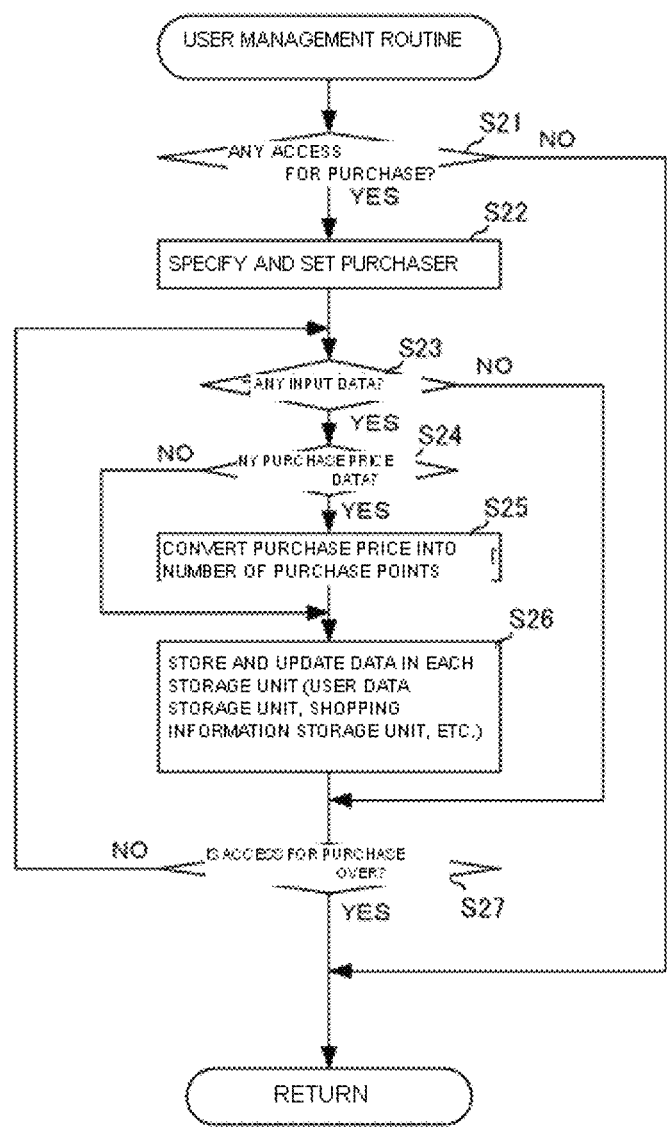
FIG. 12 is a flowchart of a user management routine.

When the advertiser management process (S1) is executed, as shown in FIG. 11, it is judged whether there has been any access for advertisement insertion (S11). When there has been no access (S11, No), this routine is terminated. In contrast, when has been any access (S11, Yes), the advertiser is specified or set (S12). Specifically, as shown in FIG. 2, based on the identification information of the advertiser contained in the data of access for advertisement insertion, the advertiser of the origin of access is specified, while when the identification information does not exist, the information of the advertiser is registered as being a new advertiser.

Subsequently, it is judged whether there is any data input (S13). When there is no data input (S13, No), it is judged whether the access for advertisement insertion has been terminated successively (S17). When the access for advertisement insertion has been terminated (S17, Yes), this routine is terminated. In contrast, when the access for advertisement insertion has not been terminated (S17, No), the process is executed again from S13.

In S13, when there is any data input (S23, Yes), successively, it is judged whether this data is an advertisement data (S14). When this is an advertisement rate data (S14, Yes), the advertisement rate is converted into the number of advertisement points (S15), and the data is recorded and updated in each storage unit (S16). In contrast, when it is not an advertisement rate data (S14, No), this data is recorded and updated in each storage unit (S16). Thereafter, it is judged whether the access for advertisement insertion is terminated judgment (S17), and this routine is repeated until the access ends.

(User Management Routine)

When the user management process (S2) is executed, as shown in FIG. 11, it is judged whether there has been any access for purchase (S21). When there has been no access (S21, No), this routine is terminated. In contrast, when there is any access (S21, Yes), the purchaser is specified or set (S22). Specifically, as shown in FIG. 3, based on the identification information of the purchaser contained in the access data of purchase, the purchaser of the origin of access is specified, while when the identification information does not exist, the information of the purchaser is registered as being a new purchaser.

Subsequently, it is judged whether there is any data input (S23). When there is no data input (S23, No), subsequently, it is judged whether the access for purchase is terminated (S27). When the access for purchase ends (S27, Yes), this routine is terminated. In contrast, when the access for purchase has not ended (S27, No), the process is executed again from S23.

In S23, when there is any data input (S23, Yes), successively, it is judged whether this data is a purchase price data (S24). When it is a purchase price data (S24, Yes), the purchase price is converted into a number of purchase points (S25), and the data is recorded and updated in each storage unit (S26). In contrast, when it is not a purchase price data (S24, No), this data is recorded and updated in each storage unit (S26). Thereafter, it is judged whether the access for purchase is terminated (S17), and this routine is repeated until the access ends.

(Distribution Control Routine)

Figure 13:
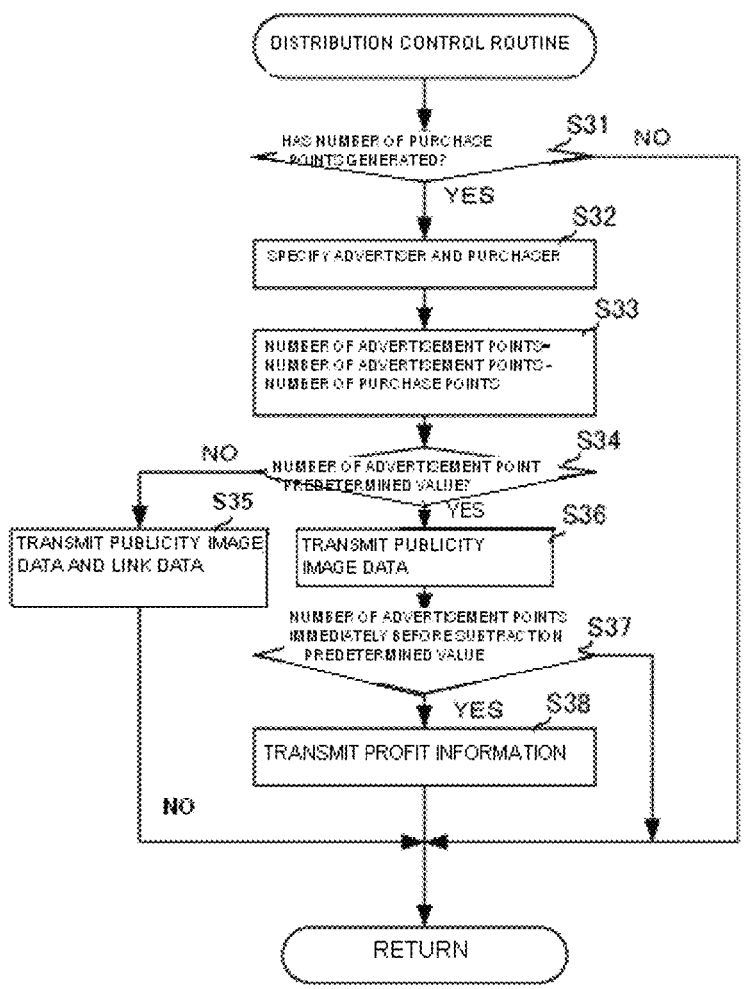
FIG. 13 is a flowchart of a distribution control routine.

When the distribution control process (S3) is executed, as shown in FIG. 13, it is judged whether a number of purchase points has been generated (S31). When no number of purchase points is generated (S31, No), this routine is terminated. In contrast, when a number of purchase points has been generated (S31, Yes), the advertiser and purchaser are specified (S32).

Thereafter, the number of purchase points is subtracted from the number of advertisement points, whereby the remaining number of advertisement points is calculated (S33). In addition, it is judged whether the number of advertisement points is equal to or higher than a predetermined value (S34). When the number of advertisement points is not equal to or higher than the predetermined value (S34, No), the image publicity data and link data are transmitted to the user terminal 5 which is the origin of access (S35), and this routine is terminated.

When the number of advertisement points is equal to or higher than the predetermined value (S34, Yes), the publicity image data is transmitted to the user terminal 5 which is the origin of access (S36). In addition, it is judged whether the number of advertisement points immediately before being subtracted is equal to or higher than the predetermined value (S7). When the number of advertisement points immediately before being subtracted is equal to or higher than the predetermined value (S37, Yes), the benefit information is transmitted (S38), and this routine is then terminated. In contrast, when the number of advertisement points immediately before being subtracted is not equal to or higher than the predetermined value (S37, No), this routine is terminated.

In the description provided above, characteristic portions have been mainly explained for better understanding of the present invention. The present invention is not limited to the embodiments explained in the description provided above, but can be also applied to other embodiments, and its applicable scope is various. Also, terminology and phraseology used herein are those used to accurately explain the present invention, and are not intended to limit the interpretation of the present invention. Further, it appears that those skilled in the art can easily assume, from the concept of the invention described herein, other configurations, systems, methods, etc. included in the concept of the present invention. Therefore, the description of claims should be considered to include equivalents as long as the scope of the technical idea of the present invention is not deviated from. Moreover, in order to sufficiently understand the specific effects of the present invention and the objects of the present invention, sufficient consideration and interpretation of literatures previously disclosed and the like are desired.

What is claimed is:

1. An advertisement distribution control device that awards a prize to at least one of a plurality of user terminals, the advertisement distribution control device having a communication interface in data communication with the plurality of user terminals each including an advertisement user interface preconfigured to receive data communications from the advertisement distribution control device, the advertisement distribution control device comprising:
a processor,
a data storage device storing:
a number of advertisement points associated with a shopping site based on an advertisement rate paid by an advertiser of a shopping site in advance,
a purchase price of a good or service purchased at the shopping site via one of the plurality of user terminals, the one of the plurality of user terminals associated with a purchaser,
an application executable by the processor, which during execution thereof:
subtracts a number of purchase points based on the purchase price of the good or service from the number of advertisement points at the shopping site,
automatically transmits link data of the shopping site to at least one of the plurality of user terminals along with advertisement data of the shopping site via the advertisement user interface when the number of advertisement points is equal to or higher than a predetermined number, the transmitted link and advertisement data displayable on the advertisement user interface of the at least one of the plurality of user terminals after receipt thereof,
automatically transmits the advertisement data of the shopping site to at least one of the plurality of user terminals, without the link data, via the advertisement user interface, when the number of advertisement points is lower than the predetermined number, the transmitted advertisement data along with data corresponding to at least one of a graphical representation and an alphanumerical representation of the number of advertisement points remaining before the prize is awarded being displayable on the advertisement user interface of the at least one of the plurality of user terminals after receipt thereof, and
selects a specific user terminal from among the plurality of user terminals and automatically transmits prize information to the specific user terminal selected via the advertisement user interface, such that after the prize information is received, it is displayable on the advertisement user interface of the selected user terminal, when the number of advertisement points turns from being equal to or higher than a predetermined number to being lower than the predetermined number.

2. The advertisement distribution control device of claim 1, wherein the specific user terminal selected is selected from among the plurality of user terminals at which a good or service has been purchased from the shopping site.

3. The advertisement distribution control device of claim 1, wherein the specific user terminal selected is randomly selected from among the plurality of user terminals.

4. An advertisement distribution system that awards a prize to a user thereof, the system comprising:
a plurality of user terminals each including a display and an advertisement user interface;
an advertisement distribution server including a processor;
an application executable by the processor; and,
a storage device;
wherein, each of the plurality of user terminals including the advertisement user interface is preconfigured to allow the advertisement distribution server to communicate with each of the user terminals via the advertisement user interface and display information, received from the advertisement distribution server, on the advertisement user interface, wherein, the storage device stores information pertaining to a number of remaining advertisement points associated with a retailer and purchase information associated with goods and services offered by the retailer;

wherein, during execution of the application by the processor:

when specific goods and services offered by the retailer are purchased from the retailer via the advertisement user interface of one of the plurality of user terminals, the number of remaining advertisement points stored in the storage device is reduced according to the purchase information associated with the specific goods and services purchased;

when the number of remaining advertisement points stored in the storage device and associated with the retailer is equal to or higher than a predetermined number, the advertisement distribution server automatically transmits to each of the plurality of user terminals, via the advertisement user interface, advertisement information displayable on the advertisement user interface of each of the user terminals and pertaining to the retailer along with a link to a website of the retailer;

when the number of remaining advertisement points stored in the storage device and associated with the retailer is lower than the predetermined number, the advertisement distribution server automatically transmits to each of the plurality of user terminals, via the advertisement user interface, advertisement information displayable on the advertisement user interface of each of the user terminals and pertaining to the retailer without including the link to the website of the retailer, the advertisement information displayable on the advertisement user interface further including at least one of a graphical representation and an alphanumerical representation of the number of advertisement points remaining before the prize is awarded; and, when the number of remaining advertisement points stored in the storage device and associated with the retailer shifts from being equal to or higher than the predetermined number to being lower than the predetermined number, the advertisement distribution server automatically selects a specific user terminal from among the plurality of user terminals, and automatically transmits prize information to the selected specific user terminal, via the advertisement user interface, which prize information is displayable on the advertisement user interface of the selected user terminal.

5. The advertisement distribution system of claim 4, wherein the specific user terminal selected from among the plurality of user terminals to receive the prize information corresponds to the one of the plurality of user terminals from which goods and services were purchased from the retailer so as to cause the number of remaining advertising points to shift from being equal to or higher than the predetermined number to being lower than the predetermined number.

6. The advertisement distribution system of claim 4, wherein at least one of the user terminals comprises a smartphone.

7. The advertisement distribution system of claim 4, wherein the advertisement information comprises at least one of a still image, a movie, and a graphical representation indicating a real time amount of advertisement points remaining.

* * * * *